United States Patent

Masaki et al.

[11] Patent Number: 5,879,803
[45] Date of Patent: Mar. 9, 1999

[54] CERAMIC MATRIX COMPOSITES WITH BN INTERFACE

[75] Inventors: Shoju Masaki, Tachikawa; Takeshi Nakamura, Tokorozawa; Kaoru Miyahara, Yokohama; Hiroshige Murata, Funabashi, all of Japan

[73] Assignee: Ishikawajima-Harima Heavy Industries Co., Ltd., Tokyo, Japan

[21] Appl. No.: 884,136

[22] Filed: Jun. 27, 1997

[51] Int. Cl.⁶ .................................. B32B 9/08
[52] U.S. Cl. .................. 428/378; 428/364; 428/366; 428/375; 428/379; 428/699; 428/701; 428/702; 428/704; 478/380; 478/384; 478/697; 478/698
[58] Field of Search ............................. 428/378, 375, 428/366, 364, 379, 380, 384, 698, 704, 697, 699, 701, 702

[56] References Cited

U.S. PATENT DOCUMENTS

| | | | |
|---|---|---|---|
| 4,605,588 | 8/1986 | Simpson et al. | 428/375 |
| 4,642,271 | 2/1987 | Rice | 428/698 |
| 4,869,943 | 9/1989 | Corbin et al. | |
| 4,885,199 | 12/1989 | Corbin et al. | |
| 5,164,341 | 11/1992 | Chyung et al. | 428/378 |

*Primary Examiner*—Archene Turner
*Attorney, Agent, or Firm*—Griffin, Butler Whisenhunt & Szipl, LLP

[57] ABSTRACT

There is provided Ceramic matrix composites comprising fibers, BN coating applied to the fibers, the BN coating being composed of BN and one of $Y_2O_3$, $Sc_2O_3$, $ZrO_2$ and lanthanoid family oxide or combinations thereof, and matrices interposed between the fibers. There is also provided Ceramic matrix composites comprising, fibers, BN coating applied to the fibers, the BN coating is composed of BN and coated with one of $Y_2O_3$, $Sc_2O_3$, $ZrO_2$ and lanthanoid family oxide or combinations thereof, and matrices interposed between the fibers. The ceramic matrix composites in accordance with the present invention is capable of being used at 1000 degrees centigrade or greater in air.

2 Claims, 2 Drawing Sheets

FIG. 3

|  |  | TEMPERATURE [°C] |
|---|---|---|
| III A | Sc2O3 | 1526 |
|  | Y2O3 | 1373 |
| IV A | TiO2 | 1200 |
|  | ZrO2 | 1300 |
|  | HfO2 |  |
| V A | Nb2O3 | 1155 |
| III B | Al2O3 | 1035 |
| Ln | La2O3 | 1136 |
|  | Ce2O3 |  |
|  | Pr2O3 |  |
|  | Nd2O3 | 1143 |
|  | Pm2O3 |  |
|  | Sm2O3 | 1136 |
|  | Eu2O3 | 1172 |
|  | Gd2O3 | 1232 |
|  | Tb2O3 |  |
|  | Dy2O3 | 1328 |
|  | Ho2O3 | 1368 |
|  | Er2O3 | 1404 |
|  | Tm2O3 | 1424 |
|  | Yb2O3 | 1446 |
|  | Lu2O3 | 1473 | ature at or below 1526° C. As Sc₂O₃ has greater mol %, the

CERAMIC MATRIX COMPOSITES WITH BN INTERFACE

BACKGROUND OF THE INVENTION

1. Field of the Invention

The invention relates to ceramic matrix composites including BN coated fibers and matrices.

2. Description of the Related Art

Ceramics has been used as heat-resistive material, but has shortcomings such as high brittleness caused by inherent characteristics thereof and low reliability with respect to strength. Hence, there has been developed fiber-reinforced ceramics toughened by incorporating fibers into ceramics matrices. In particular, there has been developed ceramic matrix composites manufactured by coating fibers with carbon (C) or boronanitoride (BN), and then bonding the fibers to ceramics. For instance, U.S. Pat. Nos. 4,869,943 and 4,885,199 have suggested ceramic matrix composites having BN interface by coating fibers with BN.

An upper limit in ambient temperature at which ceramic matrix composites having BN interface can be used is about 1000 degrees centigrade. Beyond 1000 degrees centigrade, BN is remarkably oxidized. As oxidized $B_2O_3$ has a melting point of about 500 degrees centigrade, bonding force between fibers and matrixes is weakened at 1000 degrees centigrade or greater in air, resulting in that it is impossible for the ceramic matrix composites to keep a certain strength thereof. However, there has been long desired ceramic matrix composites which can be used at 1000 degrees centigrade or greater, preferably up to about 1400 degrees centigrade.

SUMMARY OF THE INVENTION

It is an object of the present invention to provide ceramic matrix composites having BN interface which is capable of being used at 1000 degrees centigrade or greater in air.

In one aspect, there is provided Ceramic matrix composites comprising: fibers; BN coating applied to said fibers, said BN coating being composed of BN and one of $Y_2O_3$, $Sc_2O_3$, $ZrO_2$ and lanthanoid family oxide or combinations thereof; and matrices interposed between said fibers.

In another aspect, there is provided Ceramic matrix composites comprising: fibers; BN coating applied to said fibers, said BN coating is composed of BN and coated with one of $Y_2O_3$, $Sc_2O_3$, $ZrO_2$ and lanthanoid family oxide or combinations thereof; and matrices interposed between said fibers.

FIG. 1 is a constitutional diagram of $B_2O_3$ and $Sc_2O_3$. An axis of abscissa of FIG. 1 represents mol % and an axis of ordinate of FIG. 1 represents temperature by the unit of degrees centigrade. The constitutional diagram illustrated in FIG. 1 is depicted in E. M. Levin, J. Am. Ceram. Soc., 50[1]53, 1967. When $B_2O_3$ occupies almost 100 mol %, $B_2O_3$ turns into liquid phase at 450° C., as shown with a line A. Under 1526° C. represented with a line B, if $Sc_2O_3$ is added to liquid phase $B_2O_3$, solid phase $ScBO_3$ and liquid phase exist together. When $B_2O_3$ and $Sc_2O_3$ exist both at 50 mol %, there is produced mono phase $ScBO_3$. When $Sc_2O_3$ exist at 50 mol % or more, solid phase $ScBO_3$ and solid phase $Sc_2O_3$ coexist. The solid phase $ScBO_3$ and solid phase $Sc_2O_3$ turn into solid phase $Sc_2O_3$ and liquid phase, when a temperature is beyond 1582° C.

A thickness of BN coating is in nanometer or sub-micron order, and oxidation takes place at a surface of BN coating. If BN coating contains $Sc_2O_3$ therein or is coated with $Sc_2O_3$, $Sc_2O_3$ reacts with $B_2O_3$ which already turned to liquid phase by oxidization, as explained above, and make stable the coating. Although liquid phase exist under line B, as the mass is very few and solid phase is rich in high concentration parts of $Sc_2O_3$, BN coating can transfer bonding force with fibers and matrices. This ensures that bonding force between BN coating and matrices is not so much decreased, thereby assuring the use at ambient temperature at or below 1526° C. As $Sc_2O_3$ has greater mol %, the bonding force between BN coating and matrices is less decreased. The temperature 1526° C. is inherent to $Sc_2O_3$. Since $Y_2O_3$, $ZrO_2$ and lanthanoid family oxide have inherent temperatures greater than 1000° C., they can be used at ambient temperature at or below their inherent temperatures.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 3 is a list showing temperatures at which the listed oxides turn into liquid phase in a constitutional diagram of oxides and $B_2O_3$.

DESCRIPTION OF THE PREFERRED EMBODIMENT

A preferred embodiment in accordance with the present invention will be explained hereinbelow with reference to drawings. In this embodiment, ceramic matrix composites in accordance with the embodiment is employed to manufacture blades for jet engine or gas turbine required for heat resistance, impact resistance and high specific strength. Some of those blades actually operate at about 1000° C. The embodiment ensures the blades to be able to operate at 1000° C. or greater, for instance, at 1400° C. The ceramic matrix composites in accordance with the embodiment includes silicon carbide (SiC) fibers and matrices made of SiC. SiC is material which does scarcely decrease the strength up to about 1500° C.

Hereinbelow is explained a method of fabricating ceramic matrix composites in accordance with the embodiment. First, fibers are coated with BN by chemical vapor infiltration (CVI). Then, one of $Y_2O_3$, $Sc_2O_3$, $ZrO_2$ and lanthanoid family oxides (hereinafter, these are referred to simply as "oxide") is dissolved in a solvent. The BN coated fibers are sintered in a vacuum furnace with being soaked in the solvent. Then, SiC matrices are precipitated at a surface of the fibers coated with BN and oxide.

Hereinbelow is explained another method of fabricating ceramic matrix composites. First, the fibers are coated with BN by CVI. Then fibers are impregnated with oxide by a sol/gel process and dried. Then, SiC matrices are precipitated on the BN coating by CVI.

Figure 2:
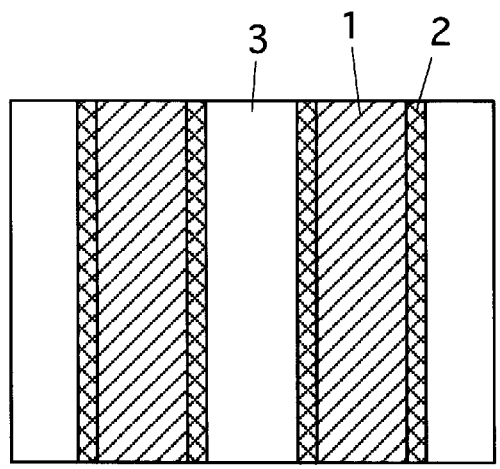
FIG. 2 is a cross-sectional view of ceramic matrix composites having BN interface, fabricated in accordance with the preferred embodiment of the present Invention.

FIG. 2 shows a cross-section of the ceramic matrix composites having BN interface, made in accordance with the above mentioned two methods. As illustrated, the fibers 1 are coated with the BN interfaces 2 in which BN and oxide exist together. The matrices 3 are sandwiched between the BN interfaces 2.

If the ceramic matrix composites having BN interfaces made in accordance with the above mentioned two methods is used in air at about 1000° C. to 1400° C., BN is oxidized into liquid phase $B_2O_3$ by making contact with atmospheric air, whereas oxide, for instance, $Sc_2O_3$ reacts with $B_2O_3$ to thereby turn into solid phase $ScBO_3$. A thickness of the BN coating is from nanometer to micron order. A surface of the BN coating is oxidized to thereby turn into liquid phase $B_2O_3$. Since there exists solid phase $ScBO_3$ in the liquid phase $B_2O_3$, bonding force can be transferred with fibers and matrices. Therefore material strength is not so much decreased. As having been discussed with reference to FIG. 1, as $Sc_2O_3$ exists in a greater amount, solid phase $ScBO_3$ exists in a greater amount. If $Sc_2O_3$ occupies 50 mol % against $B_2O_3$, all ingredients turn into solid phase, resulting in that the bonding force between the BN coating and matrices is scarcely decreased. As liquid and solid phases $ScBO_3$ exist together below the line B indicating 1526° C., the ceramic matrix composites can be used at ambient temperature at or below 1526° C.

Figure 1:
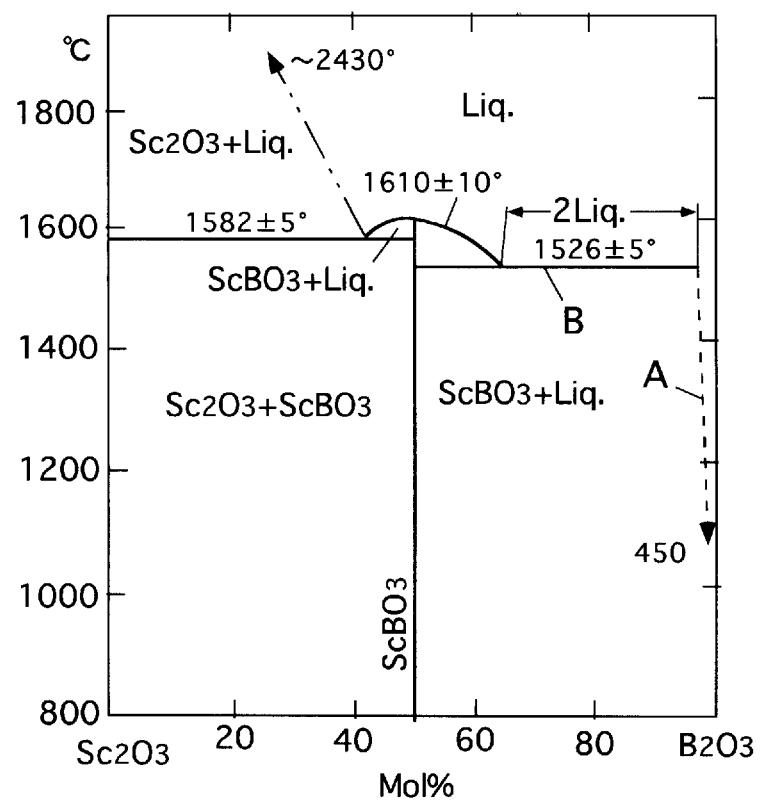
FIG. 1 is a constitutional diagram of $B_2O_3$ and $Sc_2O_3$.

Constitutional diagrams similar to a constitutional diagram of $B_2O_3$ and $Sc_2O_3$ as illustrated in FIG. 1 can be obtained for oxides other than $Sc_2O_3$. However, a temperature indicated with the line B which is a boundary between (solid phase $ScBO_3$+liquid phase) and liquid phase is different for each of oxides. FIG. 3 is a list of temperatures at which each of the listed oxides and $B_2O_3$ turn into liquid phase in a constitutional diagram of the oxide and $B_2O_3$, that is, a list of temperatures corresponding to the temperature indicated with the line B in FIG. 1. In FIG. 3, "Ln" indicates lanthanoid family oxides. Blanks in the temperature column mean that data about the temperature could not be obtained. In order to employ the ceramic matrix composites at ambient temperature of 1400° C. or greater, the line B has to indicate a temperature of 1400° C. or greater. Thus, $Er_2O_3$, $Tm_2O_3$, $Yb_2O_3$ and $Lu_2O_3$ as well as $Sc_2O_3$ are suitable for ingredients of the ceramic matrix composites. By making one of $Y_2O_3$, $Sc_2O_3$, $ZrO_2$ and lanthanoid family oxides coexist with BN interface, the ceramic matrix composites can be employed at ambient temperature of at least 1100° C.

As explained so far, in accordance with the present invention, BN coating of ceramic matrix composites having BN interface is composed of BN and one of $Y_2O_3$, $Sc_2O_3$ and lanthanoid family oxides. As a result, it is now possible to employ ceramic matrix composites having BN interface in atmospheric air at a higher temperature than that of conventional ones. By employing $Sc_2O_3$, it is possible to employ ceramic matrix composites having BN interface even at about 1400° C. As ceramic matrix composites contains $Y_2O_3$, $Sc_2O_3$, $ZrO_2$ or lanthanoid family oxides in a greater amount, the material can have greater strength.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. Ceramic matrix composites comprising:

fibers;

BN coating applied to said fibers, said BN coating being composed of BN and one of $Y_2O_3$, $Sc_2O_3$, $ZrO_2$ and lanthanoid family oxide or combinations thereof; and matrices interposed between said fibers.

2. Ceramic matrix composites comprising:

fibers;

BN coating applied to said fibers, said BN coating is composed of BN and coated with one of $Y_2O_3$, $Sc_2O_3$, $ZrO_2$ and lanthanoid family oxide or combinations thereof; and matrices interposed between said fibers.

* * * * *